(12) United States Patent
Ganz

(10) Patent No.: US 6,824,382 B2
(45) Date of Patent: Nov. 30, 2004

(54) CLOSING UNIT FOR AN INJECTION MOULDING MACHINE

(75) Inventor: Martin Ganz, Katzelsdorf (AT)

(73) Assignee: Ettlinger Kunststoffmaschinen GmbH, Konigsbrunn (DE)

(*) Notice: Subject to any disclaimer, the term of this patent is extended or adjusted under 35 U.S.C. 154(b) by 331 days.

(21) Appl. No.: 10/084,375

(22) Filed: Feb. 28, 2002

(65) Prior Publication Data

US 2002/0119214 A1 Aug. 29, 2002

Related U.S. Application Data

(63) Continuation-in-part of application No. 09/043,931, filed as application No. PCT/CH96/00344 on Oct. 2, 1996, now abandoned.

(30) Foreign Application Priority Data

Oct. 3, 1995 (CH) .............................................. 2778/95

(51) Int. Cl.⁷ .............................................. B29C 45/64
(52) U.S. Cl. ........................................ 425/589; 425/595
(58) Field of Search .............................. 425/589, 450.1, 425/451.9, 595

(56) References Cited

U.S. PATENT DOCUMENTS 5,354,196 A * 10/1994 Ziv-Av ........................ 425/589
5,478,231 A * 12/1995 Hehl ........................... 425/589
5,578,329 A * 11/1996 Hehl ........................... 425/589

* cited by examiner

Primary Examiner—James P. Mackey
(74) Attorney, Agent, or Firm—Nath & Associates PLLC; Gary M. Nath

(57) ABSTRACT

A closing unit with rigidly mounted supporting rails (2), a stationary (6) and a movable (12) clamping plate, has a pivot bearing (14, 15) behind each of these clamping plates (6, 12). A closing drive (23) is hinged in these pivot bearings (14, 15) so that it can freely move between said pivot bearings (14, 15) and the closing forces exercised by the closing drive (23) can exercise no bending moment on the machine frame (2, 3).

8 Claims, 2 Drawing Sheets

CLOSING UNIT FOR AN INJECTION MOULDING MACHINE

This application is a continuation-in-part application of U.S. patent application Ser. No. 09/043,931, filed Apr. 21, 2000 now abandance, which is an Application under 35 U.S.C. 371 of International Application PCT/CH96/00344 with an International filed dated Oct. 2, 1996, the entire contents of which are hereby incorporated by reference in its entirety.

The present invention relates to a closing unit according to the preamble of claim 1.

Standard injection moulding machines comprise closing units in which the clamping plates are guided by a plurality of bars. However, the use of closing units without bars is becoming more common today for certain applications, in particular in the production of miniature plastic parts, because the clamping plates of bar-less closing units can be better supported, thereby counteracting bending of these clamping plates and preventing formation of burrs. A further advantage of bar-less closing units can be seen in allowing free access to them for removal of the injection moulded parts and maintenance of the die plates.

For example, DE-43'08'701 or EP 0 554 068 describe bar-less closing units in which the clamping plates are arranged in a C-shaped machine frame, whereby one of the clamping plates is rigidly fixed to one leg of this C-frame and the other clamping plate is displaced with the aid of a hydraulic system supported at the opposite leg of said C-frame. In order to compensate the opening of the die during the injection moulding process caused by the elastic bending of the C-frame, the injection ram is pivotably borne relative to the cylinder or the displaceable clamping plate. It is for these reasons that DE-42'30'348 describes the use of a toggle lever mechanism.

In order to further reduce the bending moment caused by bar-less closing units and which occurs during the injection moulding process it has been suggested in the publications DE-U-92'12'480, EP-0'554'068 or DE'43'08'962 to hinge or articulate a deformable C-shaped cross-piece or frame with the stationary die carrier on the one hand, and with the hydraulic cylinder support plate on the other hand. moments which the closing force exercises upon the machine frame. However, it has been shown that even with the use of such C-cross-pieces the alignment of the plates is not guaranteed in all cases and, in particular during injection moulding processes under high pressure, the die plates do not close securely. These closing units are no longer suitable for working with highly technical plastics, where closing forces of up to 3000 N (corresponding to 300 tons) and more must be absorbed.

It is therefore the aim of the present invention to provide a bar-less closing unit for an injection moulding machine with which qualitatively impeccable (high quality) precision miniature plastic parts can be produced. In particular it is the aim of the invention to provide a bar-less closing unit having die plates which close gaplessly, even under high closing forces.

According to the present invention, this task is solved by a closing unit with the features of claim 1. In particular, this closing unit comprises rigidly mounted supporting rails having a stationary and a movable clamping plate. Behind each of these clamping plates are arranged pivot bearings in which is hinged or articulated a closing drive. This closing drive is not supported at the supporting rails nor at the machine base, but is freely movably suspended between the pivot bearings.

It has been shown that this inventive construction permits a surprisingly good die closure as compared to the above mentioned C-frame systems. This can be attributed to the fact that no torsion or bending moments are transmitted to the machine frame (machine base and/or supporting rails) during closure, and the strong closing forces also cannot cause any bending of the hydraulic piston between the displaceable clamping plate and the hydraulic cylinder support plate.

In a first preferred embodiment of the invention, two supporting rails are fixed to a machine base parallel to each other in such a way that in between them three neighbouring injection units can be arranged. These supporting rails each have an ear-like upwardly projecting support block to which the rigid clamping plate is attached. This rigid clamping plate is simply screwed to these support blocks, but it can just as well be welded thereto. It is understood that if it is appropriately dimensioned, this clamping plate can be directly attached to the support rail, thereby dispensing with the necessity of the support block. Neighbouring this rigid clamping plate is a displaceable clamping plate which is fixed to two glide shoes being movably arranged on the two supporting rails. Behind each of the clamping plates is arranged a pivot bearing, in the support block on the one hand and in the glide shoe on the other hand, and a closing drive is suspended in these pivot bearings. This means that the closing drive is freely suspended between the respective pivot bearings. Such closing drives are well known to the expert and essentially comprise two counter-moving structural components or drive components which lead to a closing or opening movement. According to the present invention, each of these two drive components of any known closing drive is connected to one of the above described pivot bearings.

In the preferred embodiment of the invention a hydraulic drive is used, whose cylinder is coupled to the pivot bearing arranged behind the rigid clamping plate, whilst the piston of this hydraulic drive is coupled with the pivot bearing arranged behind the displaceable clamping plate. This coupling is effected by lever arms which are rigidly connected to the cylinder or piston on the one hand, and pivotably engage in each of the pivot bearings on the other hand. In this way the forces of the closing unit can be directly transmitted via the U-shaped lever arms to the clamping units and thus to the die plates. In this way the die plates remain coplanar, even if increased closing forces make the reactive pressure of the die plates cause a bending of the closing drive, i.e. any possible bending of the closing drive does not result in a gap being formed between the die plates.

In a preferred further development of the inventive closing unit the respective drive parts of the closing drive are coupled with the pivot bearings over scissor-like crossed lever arms.

By freely suspending the closing drive to the pivot bearings, no bending moments are exercised to the machine base or to the supporting rails, and the die plates remain coplanar.

In the following the invention shall be more clearly described with the aid of an embodiment and the Figures.

Figure 1:
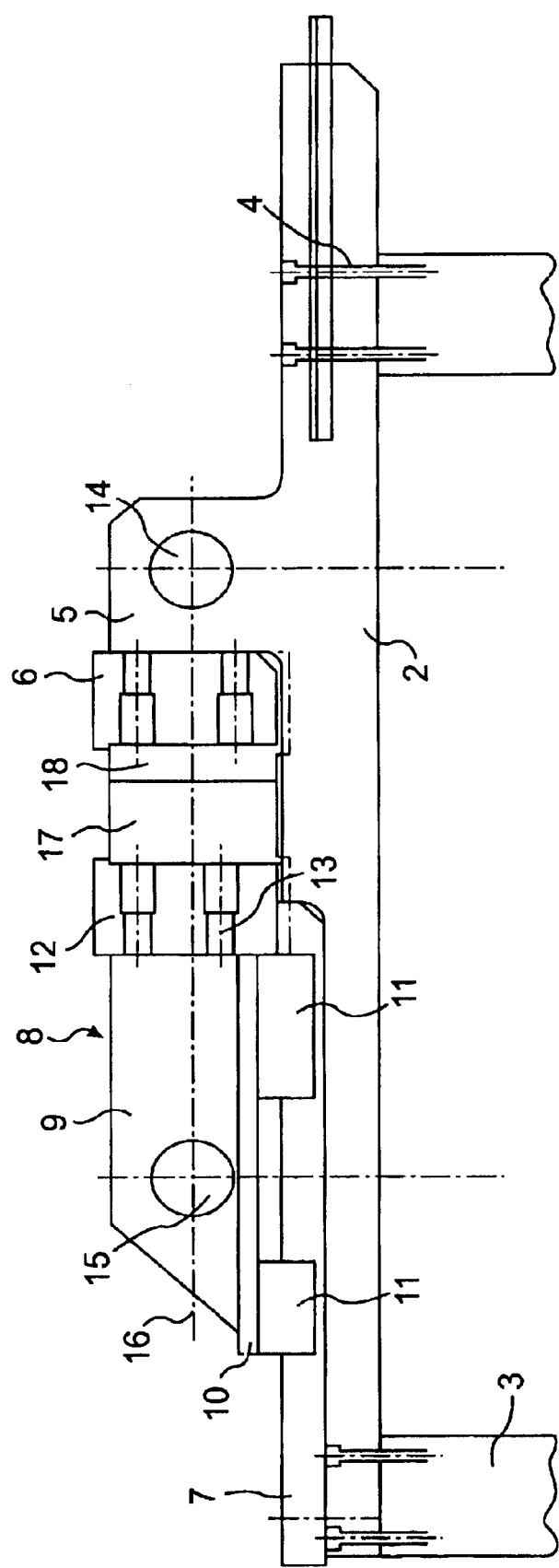
FIG. 1 shows a side sectional view of an embodiment of the inventive closing unit without closing drive.

FIG. 1 shows the essential components for the basic construction of the inventive closing unit. In the present embodiment, this basic construction comprises two parallel supporting rails 2 which are fixed to a machine base 3 by means of appropriate fixation means 4. These supporting rails 2 are symmetrical, and comprise an upwardly projecting support block 5. A stationary clamping plate 6 is attached to the support block 5's flank facing the die in such a manner that a rigid connection between the clamping plate 6 and the support block 5 is ensured. Furthermore, the supporting rail 2 has a section formed as a glide path 7, on which is mounted a glide shoe 8. This glide shoe essentially comprises a support plate 9 standing on a base plate 10. The base plate 10 rests on gliders 11 which rest on the glide path 7. In this way, the glide shoe 8 can be freely moved into the closing or opening position. It is understood that the profile of the glide path 7 and the profiles of the gliders 11 complement each other. A second clamping plate 12 is attached by suitable means 13 to the glide shoe 8's side which faces the die in such a manner that said clamping plate 12 is glidable on the supporting rail. It is not essential but it is preferable that these means 13 are formed in such a manner that the clamping plate 12 can be removed from the glide shoe 8 for maintenance purposes. It is understood that this glidable clamping plate 12 can also be articulated to the glide shoe 8. According to the invention, pivot bearings 14 and 15 are provided behind the respective clamping plates 6, 12, and therefore in the present embodiment, these pivot bearings are respectively arranged centrally in the support block 5 of the supporting rail 2 and in the support plate 9 of the glide shoe 8.

Figure 2:
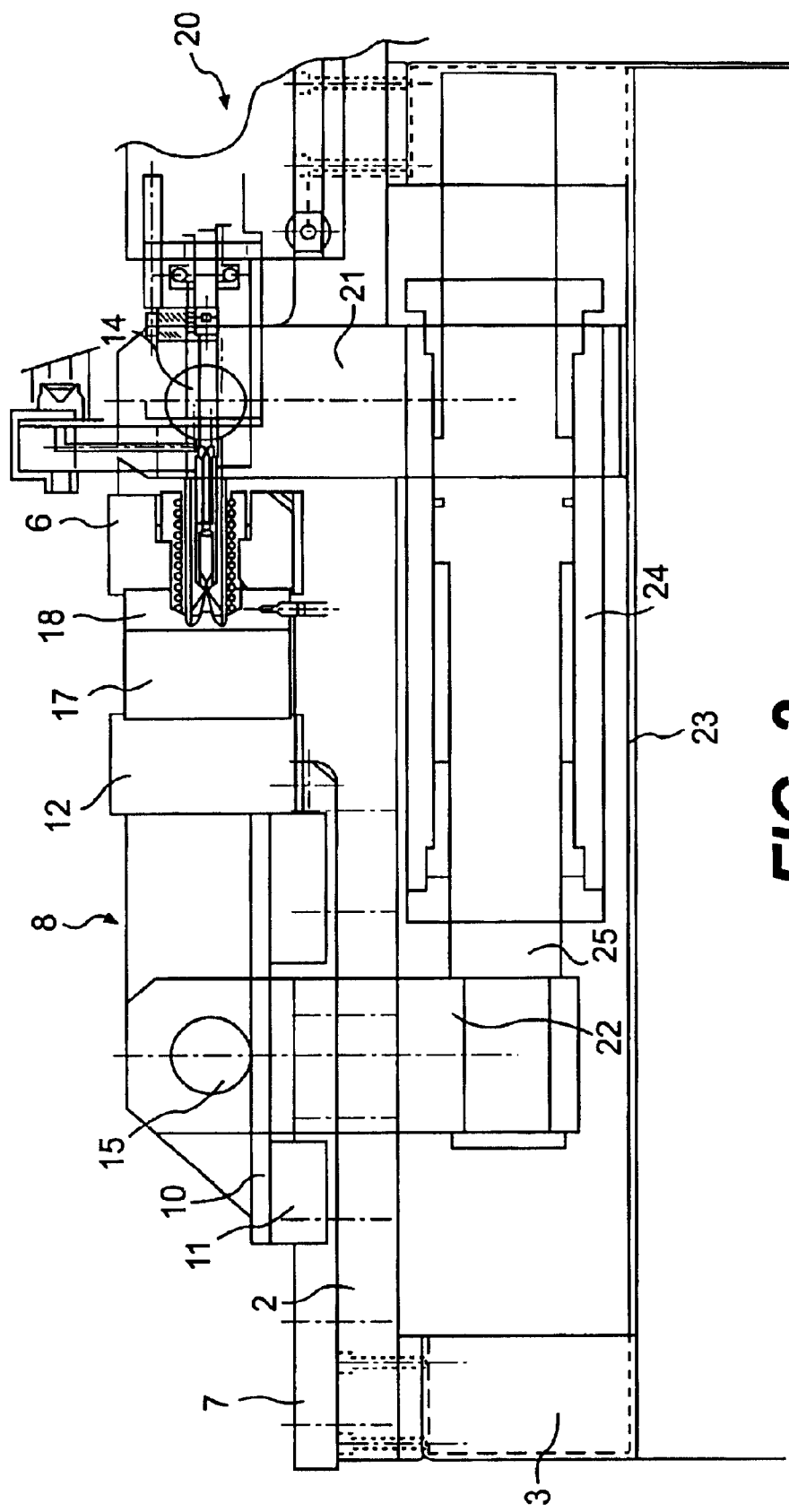
FIG. 2 shows a side sectional view of an embodiment of the inventive closing unit with closing drive.

FIG. 2 shows the closing unit according to the invention in connection with an injection moulding unit 20. In this embodiment lever arms 21, 22 are articulated in the pivot bearings 14, 15, which lever arms bear a hydraulic system 23. This hydraulic system 23 essentially comprises a hydraulic cylinder 24 and a hydraulic piston 25 which are sealed against each other in a known manner and which are displaceable against each other. A corresponding control unit is coupled to the controls of the injection moulding machine. In the illustrated embodiment, the lever arm 21 which is articulated to the support block 5 is rigidly connected to the hydraulic cylinder 24, whilst the lever arm 22 which is articulated to the glide shoe 8 is rigidly connected to the hydraulic piston 25. In this way, the glide shoe 8 can directly follow the movements of the hydraulic piston 25. In the present embodiment the opening distance is 150 mm and the form plates are dimensioned 3×120×97 mm. Closure of the die is therefore effected by the two counter-moving hydraulic components moving towards and penetrating each other. In the event of an increased closure force—in the present example more than 100 kN—this inventive construction allows that the torque between the hydraulic system 23 and the lever arms 21, 22 which torque results from this closure force, causes a bending of the entire hydraulic system 23, the clamping plates 6, 12, however, remaining constantly coplanar because of the pivot bearings 14, 15.

With the present invention it is possible to construct the lever arms 21, 22 as short as possible and to place the two pivot bearings 14, 15 as close to each other as possible in order to reduce as far possible the bending moments occurring during die closure and effecting the closing drive.

In a further embodiment of the invention, two closing drives can be connected to the same pair of pivot bearings, for example in such a manner that the one closing drive is articulated in a U-shape whilst the second closing drive engages the same pivot bearings over crossed lever arms. Driving units which are thus coupled can support each other when high closure forces are used, or can complement each other during operation with short working cycles.

It is obvious to the expert in this field that the driving units which are normally arranged on each supporting rail side can be coordinated by means of suitable controls and/or can be mechanically coupled together. Suitable control means are within the scope of knowledge of the expert. Other possibilities for using the functioning principle of the inventive closing unit can be seen in bar-less pressing or punching devices.

What is claimed is:

1. Closing unit without bars for an injection moulding machine having at least one closing drive (23) comprising two counter-moving displaceable components, with supporting rails (2) being mountable on a machine base (3) for a stationary and a glidable clamping plate (6, 12) for clamping one or more first and second form plates (17, 18), which stationary clamping plate (6) is rigidly connected to the supporting rails (2) and which displaceable clamping plate (12) is glidably supported on the supporting rails (2), whereby the stationary clamping plate (6) is connected to one of the two components (24, 25) of the closing drive (23) by means of a pivot bearing (14), characterized in that the glidable clamping plate (12) is connected to the other of the two components (24, 25) of the closing drive (23) by means of at least one pivot bearing (15) in such a manner that the closing drive (23) is secured only in these pivot bearings (14, 15), and thus the closing forces of the closing drive (23) only act upon the clamping plates (6, 12) via these pivot bearings (14, 15), and no bending moments are transmitted to the supporting rails (2) or to the machine base (3).

2. Closing unit according to claim 1, characterized in that a lever arm (21, 22) is provided between each of the two counter-moving drive components (24, 25) of the closing drive (23) and the pivot bearing (14, 15) connected to such drive component.

3. Closing unit according to claim 2, characterized in that the lever arms (21, 22) are rigidly connected to the displaceable drive components (24, 25) of the closing drive (23).

4. Closing unit according to claim 2, characterized in that the lever arms (21, 22) are arranged in a scissor-like manner and are displaceably connected to the displaceable drive components (24, 25) of the closing drive (23).

5. Closing unit according to claim 1, characterized in that the supporting rail (2) comprises a support block (5) to which the stationary clamping plate (6) is rigidly attached.

6. Closing unit according to claim 5, characterized in that a pivot bearing (14) is provided in the support block (5).

7. Closing unit according to claim 1, characterized in that the glidable clamping plate (12) is connected to a glide shoe (8) in which one of the pivot bearings (15) is arranged.

8. Closing unit according to claim 1, characterized in that the closing drive (23) is a hydraulic drive.

* * * * *